US011231833B2

(12) United States Patent
Lee-Baron et al.

(10) Patent No.: US 11,231,833 B2
(45) Date of Patent: Jan. 25, 2022

(54) PRIORITIZING INFORMATION WHEN APP DISPLAY SIZE IS REDUCED

(71) Applicant: Lenovo (Singapore) Pte. Ltd., Singapore (SG)

(72) Inventors: Jennifer J. Lee-Baron, Morrisville, NC (US); Amy Leigh Rose, Chapel Hill, NC (US); Nathan J. Peterson, Oxford, NC (US); Gary David Cudak, Wake Forest, NC (US); John Scott Crowe, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/739,338

(22) Filed: Jan. 10, 2020

(65) Prior Publication Data
US 2021/0216173 A1 Jul. 15, 2021

(51) Int. Cl.
*G06F 3/0482* (2013.01)
*G06F 3/0484* (2013.01)
*G06F 3/01* (2006.01)

(52) U.S. Cl.
CPC ............ *G06F 3/0482* (2013.01); *G06F 3/013* (2013.01); *G06F 3/017* (2013.01); *G06F 3/04845* (2013.01); *G06F 2203/04803* (2013.01); *G06F 2203/04806* (2013.01)

(58) Field of Classification Search
CPC ........ G06F 3/0482; G06F 3/013; G06F 3/017; G06F 3/04845; G06F 2203/04803; G06F 2203/04806; G06F 3/0481; G06F 3/048; G06F 3/011; G06F 3/01
See application file for complete search history.

(56) References Cited

U.S. PATENT DOCUMENTS

| | | | | |
|---|---|---|---|---|
| 6,564,170 B2* | 5/2003 | Halabieh | ................. | G06F 9/451 702/181 |
| 6,665,842 B2* | 12/2003 | Nielsen | ............... | G06F 16/9577 715/269 |
| 7,146,574 B2* | 12/2006 | Goldthwaite | ......... | G06F 16/904 715/838 |
| 7,386,279 B2* | 6/2008 | Wagner | ............... | G06F 3/04817 455/556.2 |
| 8,065,628 B2* | 11/2011 | Oshiro | .................. | G06F 3/0481 715/716 |
| 8,429,562 B2* | 4/2013 | Gourdol | .................. | G06F 9/451 715/837 |
| 8,510,166 B2* | 8/2013 | Neven | .................... | A61B 5/163 705/14.68 |
| 9,146,751 B2* | 9/2015 | Anzures | ............... | G06F 3/04883 |
| 9,152,230 B1* | 10/2015 | Elbing | ..................... | G06F 3/016 |
| 9,292,158 B2* | 3/2016 | Wakefield | ............. | G06F 3/0481 |
| 9,459,759 B2* | 10/2016 | Son | ..................... | G06F 3/04817 |
| 9,612,673 B2* | 4/2017 | Lavallee | ............... | G06F 3/0486 |

(Continued)

*Primary Examiner* — Jung-Mu T Chuang
(74) *Attorney, Agent, or Firm* — VanLeeuwen & VanLeeuwen; Jason A. Friday

(57) ABSTRACT

An approach is provided that detects when multiple apps are being displayed on a display screen with each of the apps having any number of user interface controls. A set of user interface controls is identified from the user interface controls being displayed. The identified set of user interface controls have an increased display preference. The identified set of user interface controls are enlarged on the display screen making such controls easier to read and select.

20 Claims, 7 Drawing Sheets

(56) References Cited

U.S. PATENT DOCUMENTS

| | | | |
|---|---|---|---|
| 9,891,780 B2* | 2/2018 | Adimatyam | G06F 3/0481 |
| 9,910,884 B2* | 3/2018 | Churchill | G06F 16/24 |
| 10,055,967 B1* | 8/2018 | Fields | H04L 51/32 |
| 10,402,161 B2* | 9/2019 | Feit | G06F 3/04842 |
| 10,564,845 B2* | 2/2020 | Kwon | G06F 3/0488 |
| 10,817,161 B2* | 10/2020 | Johansson | G06F 3/0485 |
| 11,138,712 B2* | 10/2021 | Frei | G06N 3/0454 |
| 2002/0010723 A1* | 1/2002 | Nielsen | G06T 11/00 |
| | | | 715/269 |
| 2002/0118223 A1* | 8/2002 | Steichen | G06F 3/033 |
| | | | 715/745 |
| 2003/0118087 A1* | 6/2003 | Goldthwaite | G06F 16/954 |
| | | | 375/219 |
| 2003/0121040 A1* | 6/2003 | Ferman | H04N 21/8549 |
| | | | 725/40 |
| 2004/0255150 A1* | 12/2004 | Sezan | H04N 21/4826 |
| | | | 726/27 |
| 2005/0047629 A1* | 3/2005 | Farrell | G06F 3/0481 |
| | | | 382/117 |
| 2007/0079255 A1* | 4/2007 | Gourdol | G06F 3/04817 |
| | | | 715/815 |
| 2010/0088651 A1* | 4/2010 | Srivastava | G06F 9/451 |
| | | | 715/854 |
| 2010/0248788 A1* | 9/2010 | Yook | G06F 3/1431 |
| | | | 455/566 |
| 2011/0209089 A1* | 8/2011 | Hinckley | G06F 3/0488 |
| | | | 715/810 |
| 2011/0252368 A1* | 10/2011 | Anzures | G06F 9/451 |
| | | | 715/823 |
| 2012/0290401 A1* | 11/2012 | Neven | G06K 9/00671 |
| | | | 705/14.68 |
| 2013/0086502 A1* | 4/2013 | Rysa | G06F 3/04883 |
| | | | 715/773 |
| 2013/0145304 A1* | 6/2013 | DeLuca | G06F 3/013 |
| | | | 715/781 |
| 2013/0152001 A1* | 6/2013 | Lovitt | G06F 9/451 |
| | | | 715/765 |
| 2013/0187861 A1* | 7/2013 | Lavallee | G06F 9/543 |
| | | | 345/173 |
| 2014/0013271 A1* | 1/2014 | Moore | G06F 3/04886 |
| | | | 715/792 |
| 2014/0137020 A1* | 5/2014 | Sharma | G06F 3/0486 |
| | | | 715/769 |
| 2014/0173667 A1* | 6/2014 | Koizumi | H04M 1/72484 |
| | | | 725/62 |
| 2014/0189606 A1* | 7/2014 | Shuttleworth | G06F 3/0481 |
| | | | 715/863 |
| 2014/0282119 A1* | 9/2014 | Wouhaybi | G06F 40/14 |
| | | | 715/760 |
| 2015/0049112 A1* | 2/2015 | Liu | G06T 19/006 |
| | | | 345/633 |
| 2015/0067531 A1* | 3/2015 | Adimatyam | G06Q 30/0621 |
| | | | 715/745 |
| 2015/0169099 A1* | 6/2015 | Lavallee | G06F 9/543 |
| | | | 345/173 |
| 2016/0011716 A1* | 1/2016 | Kim | G06F 3/0416 |
| | | | 345/173 |
| 2016/0196584 A1* | 7/2016 | Franklin | G06F 3/04845 |
| | | | 705/14.64 |
| 2016/0239200 A1* | 8/2016 | Fang | G06F 3/04883 |
| 2017/0308252 A1* | 10/2017 | Lee | G06F 3/04817 |
| 2018/0239511 A1* | 8/2018 | No | G06F 9/44 |
| 2018/0321739 A1* | 11/2018 | Park | G06F 3/013 |
| 2018/0329550 A1* | 11/2018 | Dellinger | G06F 3/0486 |
| 2019/0025989 A1* | 1/2019 | Kim | G06F 3/04883 |
| 2019/0339855 A1* | 11/2019 | Walkin | G06F 3/0485 |
| 2020/0005511 A1* | 1/2020 | Kavidayal | G06N 3/088 |
| 2020/0015401 A1* | 1/2020 | Frei | G06T 7/73 |
| 2020/0020093 A1* | 1/2020 | Frei | A01B 43/00 |
| 2020/0133487 A1* | 4/2020 | Zhang | G06F 3/04817 |
| 2021/0011596 A1* | 1/2021 | Johansson | G06F 3/04883 |

* cited by examiner

PRIORITIZING INFORMATION WHEN APP DISPLAY SIZE IS REDUCED

BACKGROUND

Electronic devices, especially handheld mobile devices, have relatively small display screens. Applications (apps) displayed on smaller screens often remove information or greatly reduces the size of text and controls in order to display the app on the smaller screen. This can make items appearing in the user interface on a small display screen to appear "squished" and difficult to read. In addition, due to their smaller size, controls (e.g., buttons, list boxes, etc.) appearing on the app's user interface are often difficult for the user to select and utilize. These small screen issues are exacerbated when the operating system running on the mobile device allows multiple apps to be displayed simultaneously with each of the displayed apps' user interfaces appearing even more squished, more difficult to read, and more difficult for the user to select and interact with controls appearing on the respective apps. Currently, the user's options are to either attempt to utilize the user interfaces appearing on the overly squished display or switching back to "normal" mode that only displays a single app on the display.

SUMMARY

An approach is provided that detects when multiple apps are being displayed on a display screen with each of the apps having any number of user interface controls. A set of user interface controls is identified from the user interface controls being displayed. The identified set of user interface controls have an increased display preference. The identified set of user interface controls are enlarged on the display screen making such controls easier to read and select.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

The figures show an approach that determines which information is most important to a user based on eye tracking, prior interactions, or other means, while apps are displayed in full screen mode. This determination is used to identify user interface controls that are enlarged when the app is displayed in a reduced size due to multiple apps being displayed on the screen simultaneously. For example, in a map app, the approach might determine whether "miles to a destination" is more important to a particular user than "time to the next turn." If a user refers (this can be measured by eye tracking) to that particular field more when the app is in full screen mode, then the approach prioritizes such control over other data fields when the app is running in reduced mode when multiple apps are being displayed simultaneously. This approach can also be utilized to apps that have different mobile and desktop versions of the particular application.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
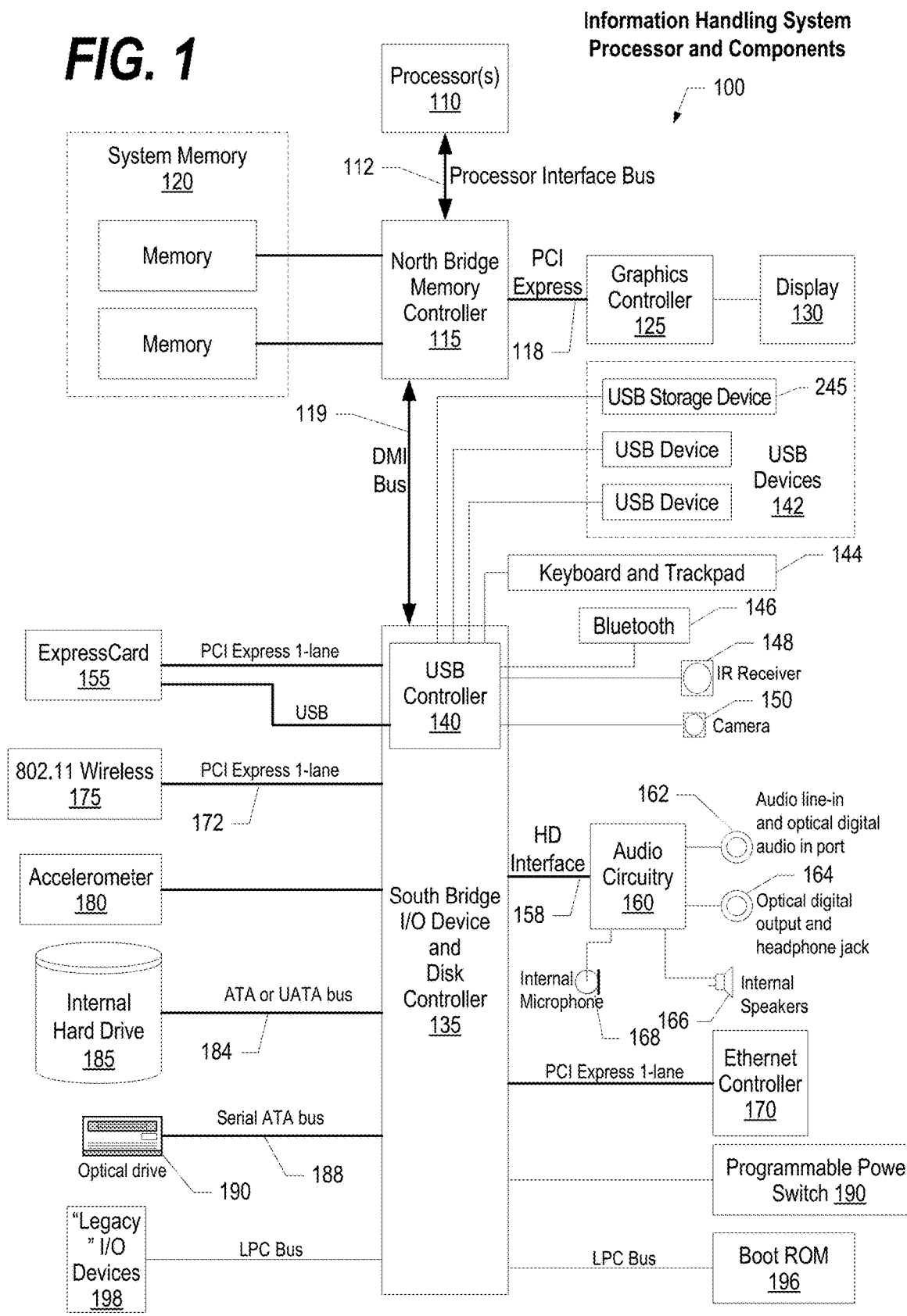
FIG. 1 is a block diagram of a data processing system in which the methods described herein can be implemented.
Figure 2:
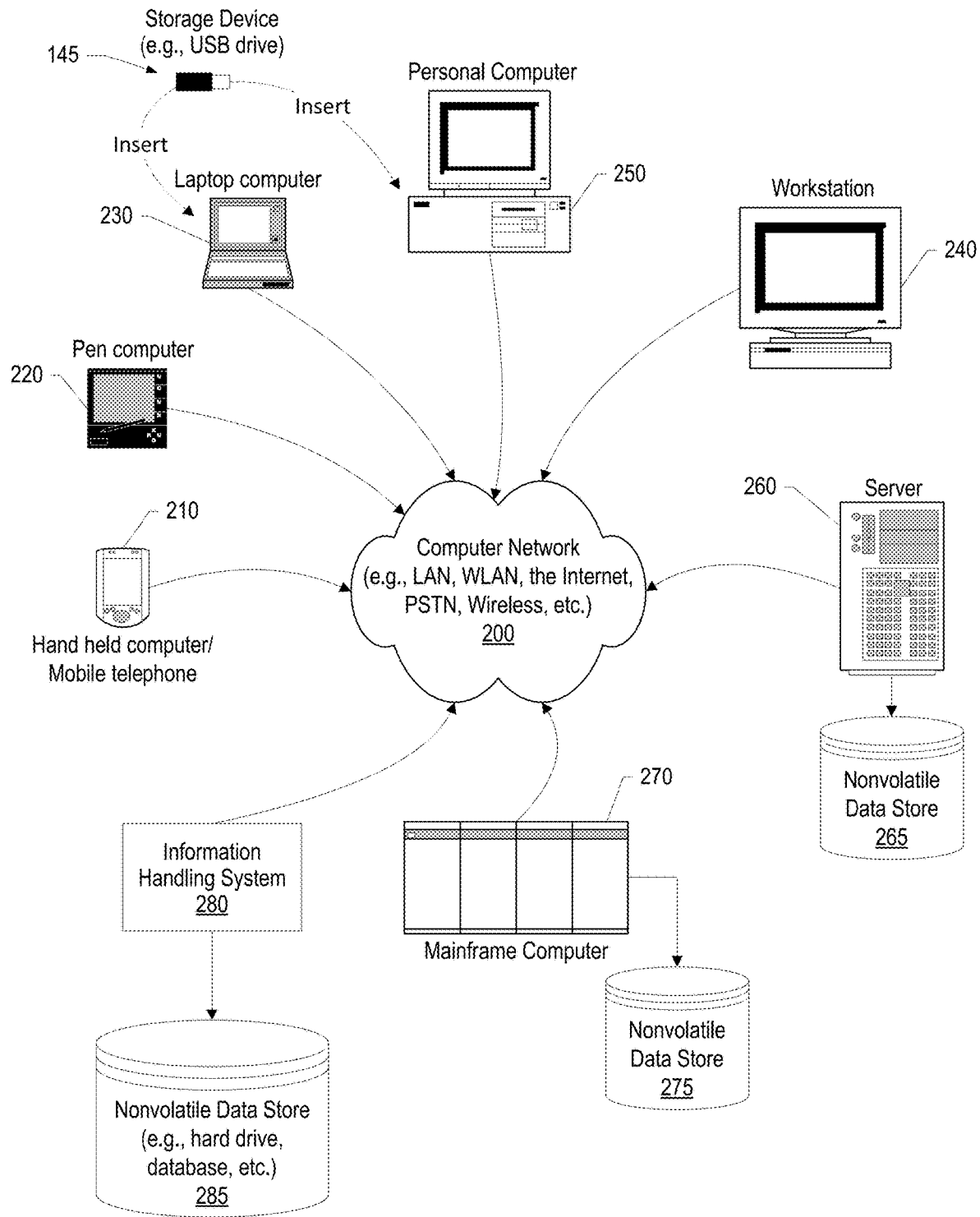
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a device that is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Accelerometer 180 connects to Southbridge 135 and measures the acceleration, or movement, of the device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may be a device that can take many forms. For example, an information handling system may take the form of a desktop device, server device, portable device, laptop device, notebook device, or other form factor device. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of devices that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling system devices include pen, or tablet, device 220, laptop, or notebook, device 230, workstation device 240, personal computer system device 250, and server device 260. Other types of information handling system devices that are not individually shown in FIG. 2 are represented by information handling system device 280. As shown, the various information handling system devices can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
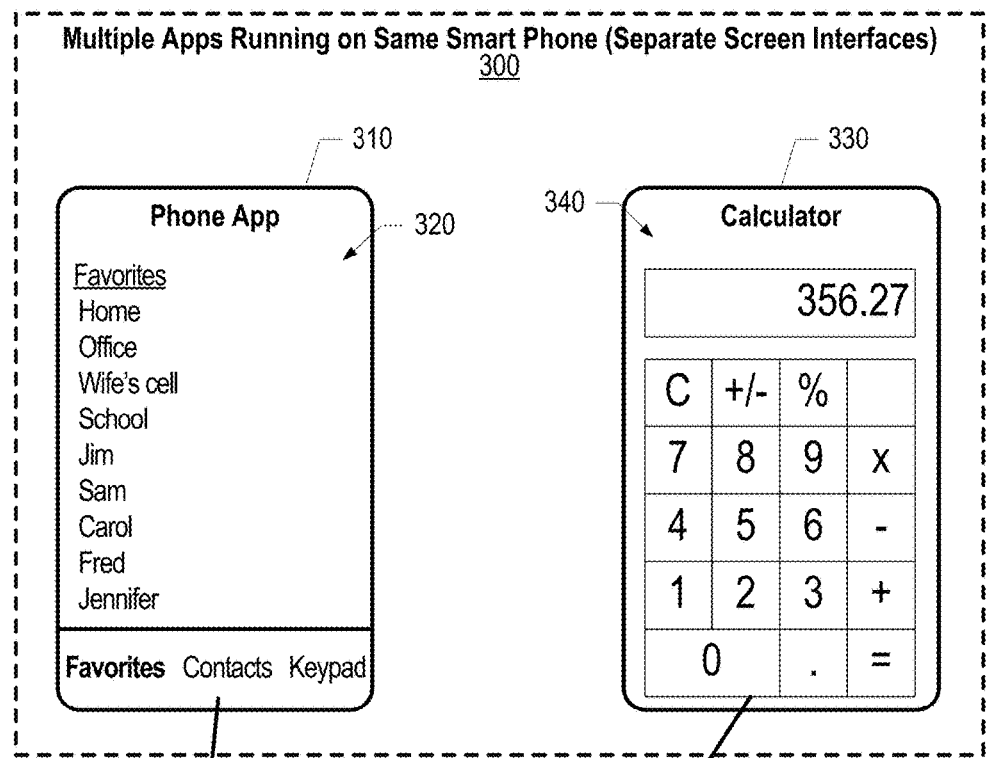
FIG. 3 is an exemplary diagram depicting the prioritized information display when the app size is reduced due to multiple apps appearing on the display screen.
Figure 3:
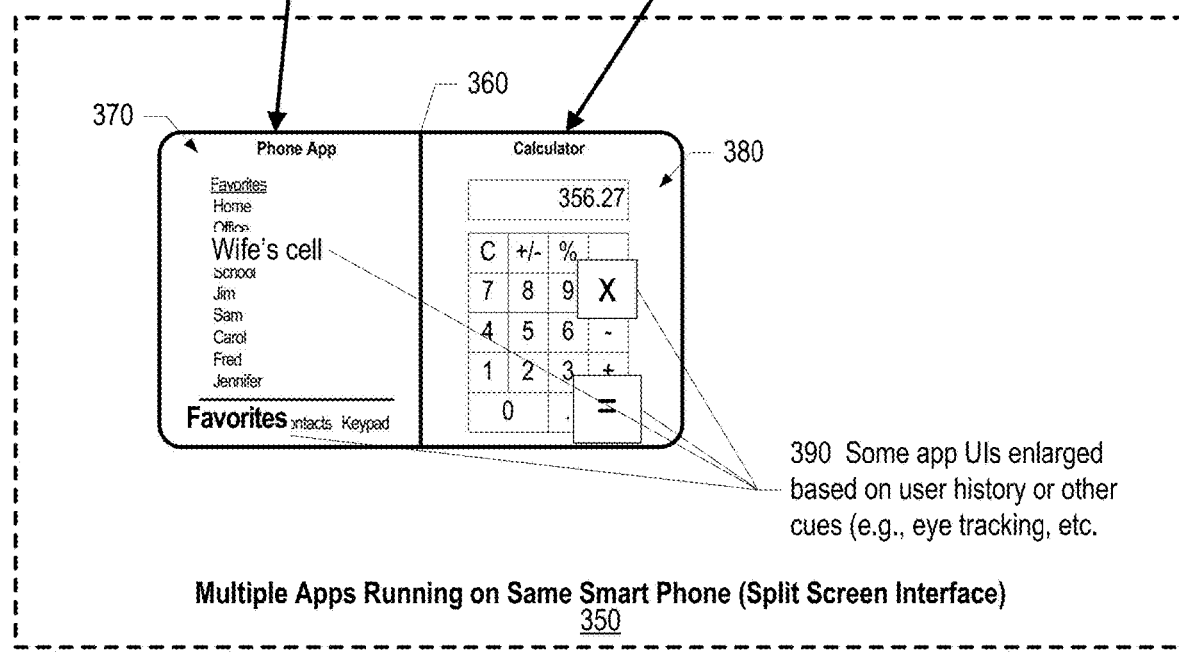

FIG. 3 is an exemplary diagram depicting the prioritized information display when the app size is reduced due to multiple apps appearing on the display screen. Container 300 depicts two apps (phone app 310 and calculator app 330) running on an information handling system, such as a smart phone, etc. that has a constrained display screen. Phone app 310 has user interfaces 320 that appear when the phone app is displayed on the smart phone, such as when the user switches to the phone app. Likewise, calculator app 330 has user interfaces 340 that appear when the calculator app is displayed on the smart phone, such as when the user switches to the calculator app.

Container 350 depicts the two apps (phone app and the calculator app) being displayed simultaneously on multi-app display 360. In the example, the apps are displayed in landscape mode, however the apps could also be displayed in portrait mode. As shown, phone app 370 is displayed on one portion of the display screen, while calculator app 380 is displayed on another portion of the display screen. As can be seen, the user interfaces (text labels, text boxes, command buttons, and the like) are generally constrained in size due to the fact that each app has less screen real estate in which to display the respective app. When this occurs, some user interfaces are increased in size using the approach described herein that prioritizes information displayed. In the example, the "Favorites" button and the "Wife's cell" button are prioritized in the phone app, while the multiplication button and the equals button are prioritized in the calculator app. Various techniques, as described herein, are used to determine which information, referred collectively herein as "user interfaces" are prioritized. In one embodiment, display of the prioritized information is enlarged as compared with the display of the non-prioritized information.

Figure 4:
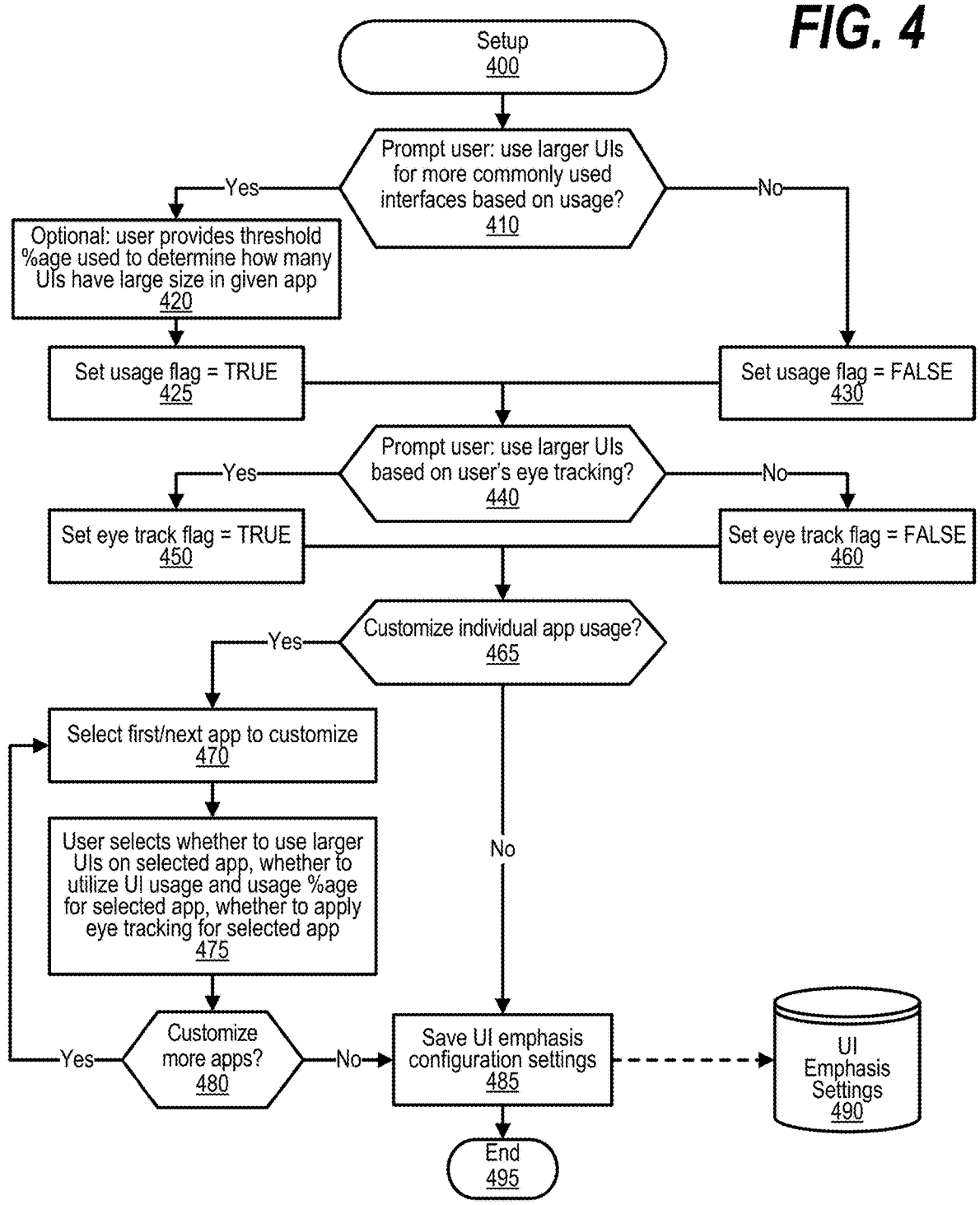
FIG. 4 is a flowchart showing steps taken by a process to setup the user interface emphasis preferences of the user.

FIG. 4 is a flowchart showing steps taken by a process to setup the user interface emphasis preferences of the user. FIG. 4 processing commences at 400 and shows the steps taken by a setup process that is used by a user to set up the user's preferences regarding prioritizing information when the user's constrained (e.g., smart phone, etc.) display is simultaneously displaying multiple apps. The process determines as to whether to use larger user interface controls (command buttons, text boxes, labels, list boxes, etc.) for more commonly used interfaces based on usage by prompting the user (decision 410). If the user wishes to use larger user interface controls for more commonly used interfaces based on usage, then decision 410 branches to the 'yes' branch whereupon, at step 420, the process has the user provide a threshold percentage that is used to determine how many of the user interface controls will be displayed in an enlarged manner in any given app and, at step 425, the process sets a usage flag to 'TRUE' indicating that the user has opted to use the prioritized information display system based on usage. On the other hand, if the user does not wish to use larger user interface controls for more commonly used interfaces based on usage, then decision 410 branches to the 'no' branch whereupon, at step 430, the process sets the usage flag to 'FALSE' indicating that the user has opted out of using the prioritized information display system based on usage.

The process determines, based on a user response to a prompt, whether the user wishes to prioritize displayed information (enlarge, etc.) by tracking the user's eye focus on the screen detecting the user's focus on particular user controls (decision 440). If the user wishes to prioritize displayed information by tracking the user's eye focus on the screen detecting the user's focus on particular user controls, then decision 440 branches to the 'yes' branch, whereupon at step 450, the process sets a flag indicating that eye movement tracking is turned ON ('TRUE'). On the other hand, if the user does not wish to prioritize displayed information by tracking the user's eye focus on the screen detecting the user's focus on particular user controls, then decision 440 branches to the 'no' branch, whereupon at step 460, the process sets a flag indicating that eye movement tracking is turned OFF ('FALSE').

The process determines, based on a user response, whether the user wishes to customize one or more individual app's usage of the prioritized display of information system (decision 465). If the user wishes to customize one or more individual app's usage of the prioritized display of information system, then decision 465 branches to the 'yes' branch to perform steps 470 through 480. On the other hand, if the user does not wish to customize one or more individual app's usage of the prioritized display of information system, then decision 465 branches to the 'no' branch bypassing steps 470 through 480. If the user wishes to customize one or more individual app's usage of the prioritized display of information system, then steps 470 through 480 are performed.

At step 470, the process receives the user's selection of the first app to customize. At step 475, the user selects whether to use larger user interface controls on the selected app, whether to utilize user interface control usage and usage percentages for the selected app, and whether to apply eye tracking for selected app. The process determines whether the user wishes to customize more apps (decision 480). If the user wishes to customize more apps, then decision 480 branches to the 'yes' branch which loops back to step 470 to select and customize the next app. This looping continues until no more apps are selected to customize, at which point decision 480 branches to the 'no' branch exiting the loop. At step 485, the process saves the user interface control emphasis (e.g., enlargement) configuration settings in data store 490. FIG. 4 depiction of setup processing thereafter ends at 495.

Figure 5:
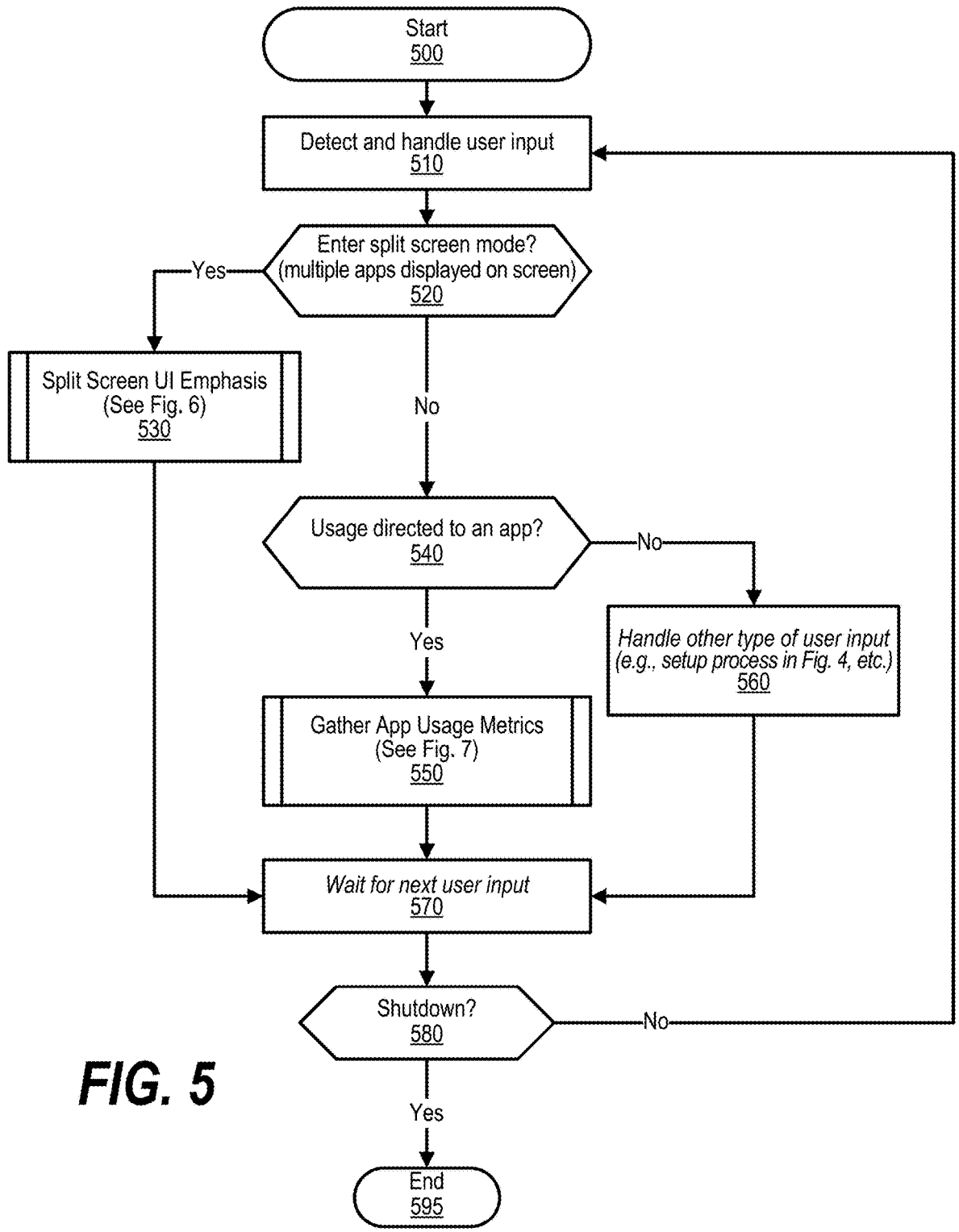
FIG. 5 is a flowchart showing steps taken by a process that prioritizes information displayed when the app size is reduced due to multiple apps appearing on the display screen.

FIG. 5 is a flowchart showing steps taken by a process that prioritizes information displayed when the app size is reduced due to multiple apps appearing on the display screen. FIG. 5 processing commences at 500 and shows the steps taken by a process that prioritizes information, such as user interface controls, when display size is reduced, such as when multiple apps are displayed on a smart phone display. At step 510, the process detects and handles user input received at the device from the device's user.

The process determines whether the operating system of the device has entered split screen mode in which multiple apps are displayed simultaneously on the display screen (decision 520). If the device has entered split screen mode, then decision 520 branches to the 'yes' branch whereupon, at predefined process 530, the process performs the Split Screen User Interface Emphasis routine (see FIG. 6 and corresponding text for processing details).

On the other hand, if the device has not entered split screen mode, then decision 520 branches to the 'no' branch to perform steps 540 through 560. First, the process determines whether the user's actions are directed to an app that is being displayed on the device (decision 540). If the user's actions are directed to an app being displayed on the device, then decision 540 branches to the 'yes' branch whereupon, at predefined process 550, the process performs the Gather App Usage Metrics routine (see FIG. 7 and corresponding text for processing details). On the other hand, if the user's actions are not being directed to an app being displayed on the device, then decision 540 branches to the 'no' branch whereupon, at step 560 the process handles other type of user input (e.g., setup process in FIG. 4, etc.).

After the user's detected action has been handed, at step 570, the process waits for next user input to be detected. The process determines as to whether the user has shutdown the device or continues using the device (decision 580). If the user has shutdown the device, then decision 580 branches to the 'yes' branch whereupon processing ends at 595. On the other hand, if the user continues using the device, then decision 580 branches to the 'no' branch which loops back to step 510 to receive and handle the user's next input as described above. This looping continues until the user shuts down the device.

Figure 6:
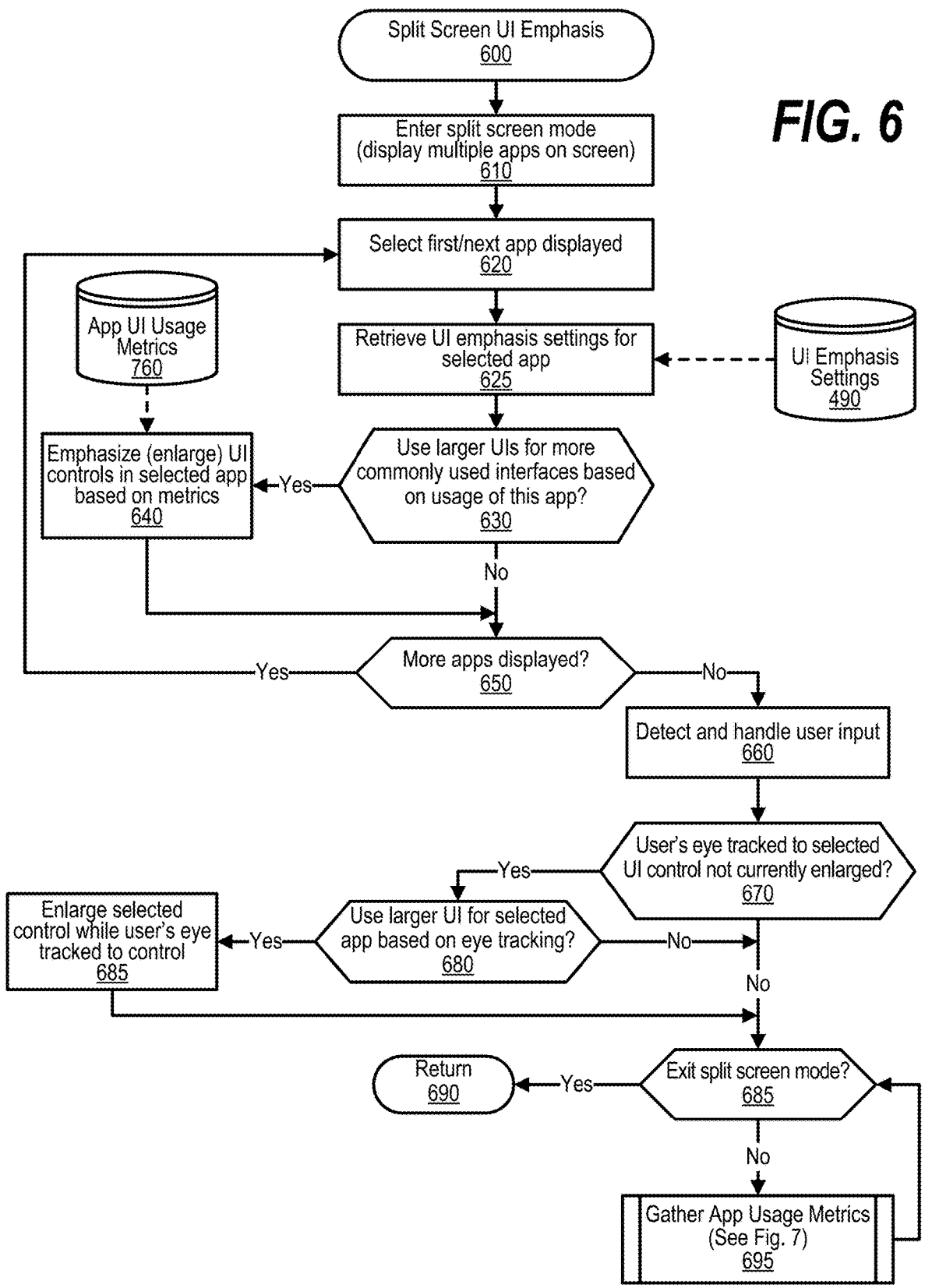
FIG. 6 is a flowchart showing steps taken by a process emphasizes particular information displayed on apps when multiple apps appear on the display screen.

FIG. 6 is a flowchart showing steps taken by a process emphasizes particular information displayed on apps when multiple apps appear on the display screen. FIG. 6 processing commences at 600 and shows the steps taken by a process that is performed to provide enlarged user interface controls when an app is being used in split screen mode. At step 610, the process enters split screen mode during which two or more apps are displayed on the display screen simultaneously.

At step 620, the process selects the first app that is displayed on the display screen. At step 625, the process retrieves the user interface control emphasis settings for selected app. The emphasis settings are retrieved from data store 490 and were established by the user during the setup routine shown in FIG. 4.

The process determines as to whether the emphasis settings are set to use larger user interface controls for more commonly used user interfaces based on the utilization of this app (decision 630). If larger user interface controls are being used for more commonly used interfaces based on the usage of this app, then decision 630 branches to the 'yes' branch whereupon, at step 640, the process emphasizes (e.g., enlarges, etc.) the user interface controls in the selected app based on utilization metrics gathered and stored in data store 760 with such metrics being gathered using the routine shown in FIG. 7.

On the other hand, if larger user interface controls are not being used for more commonly used interfaces based on the usage of this app, then decision 630 branches to the 'no' branch bypassing step 640. The process determines whether there are more apps that are being displayed on the display screen (decision 650). If there are more apps that are being displayed on the display screen, then decision 650 branches to the 'yes' branch which loops back to step 620 to select and process the next app as described above. This looping continues until all of the apps that are being displayed have been processed, at which point decision 650 branches to the 'no' branch exiting the loop.

At step 660, the process detects and handles the user input received at the device. The process determines whether the user's eye movement has been tracked to a selected user interface control that is not currently being enlarged (decision 670).

If the user's eye movement has been tracked to a selected user interface control that is not currently being enlarged, then decision 670 branches to the 'yes' branch whereupon decision 680 determines whether the user has opted to use eye movement to control the enlargement of user interface controls. If the user has opted to use eye movement tracking to enlarge user interfaces on which the user's eyes focus, then decision 680 branches to 'yes' branch and, at step 685, the process enlarges the selected user interface control while the user's eye is tracked to such control. If either the user's eye is not tracked to a control not currently being enlarged (decision 670 branching to the 'no' branch) or if the user has not opted to use eye tracking to enlarge user interface controls (decision 680 branching to the 'no' branch), in either case bypassing step 685.

The process determines as to whether the user has exited split screen mode and returned to viewing a single app on the display (decision 685). If the user has exited split screen mode, then decision 685 branches to the 'yes' branch whereupon processing returns to the calling routine (see FIG. 5) at 690. On the other hand, if the device is still in split screen mode, then decision 685 branches to the 'no' branch whereupon, at predefined process 695, the process performs the Gather App Usage Metrics routine (see FIG. 7 and corresponding text for processing details). Processing loops back to step 660 to continue detecting and handling user input while the device is in split screen mode.

Figure 7:
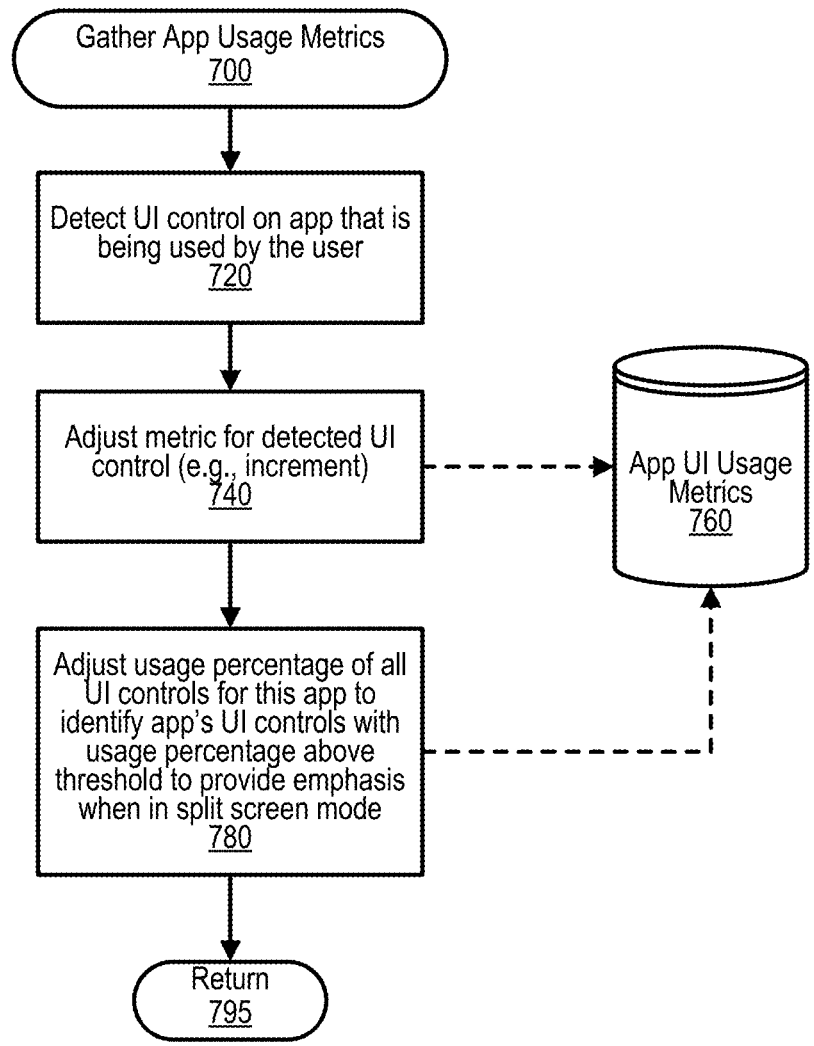
FIG. 7 is a flowchart showing steps taken by a process that gathers usage metrics that are used to determine which information displayed on the display screen is emphasized when the display is displaying multiple apps simultaneously.

FIG. 7 is a flowchart showing steps taken by a process that gathers usage metrics that are used to determine which information displayed on the display screen is emphasized when the display is displaying multiple apps simultaneously. FIG. 7 processing commences at 700 and shows the steps taken by a process that gathers app usage metrics that are used to determine which user interface controls to prioritize (e.g., enlarge, etc.). At step 720, the process detects a user interface control on the app that is being used by the user, such as a command button being pressed, a list box being used, a text box being selected, or the like. At step 740, the process adjusts the metric for the detected user interface control, such as by incrementing a counter that keeps track of the number of times the user has used a particular user interface control. The app user interface control usage metrics are stored in data store 760. At step 780, the process adjusts the usage percentage of all of the user interface controls for this app in order to identify the app's user interface controls with a utilization percentage that are above a threshold. The user interface controls with a higher utilization are provided an emphasis (e.g., enlarged, etc.) when the app is being used when the device is in split screen mode. The usage percentage data is also stored in data store 760. FIG. 7 processing thereafter returns to the calling routine (see FIG. 5) at 795.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. As used herein, a computer readable storage medium does not include a transitory signal.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While particular embodiments have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to others containing only one such element, even when the same claim includes the introductory phrases "one or more" or "at least one" and indefinite articles such as "a" or "an"; the same holds true for the use in the claims of definite articles.

What is claimed is:

1. A method, implemented by a mobile information handling system comprising one or more processors, a memory accessible by at least one of the processors, and a display screen accessible by at least one of the processors, the method comprising:
   detecting that a plurality of apps are being displayed on the display screen, wherein each of the apps includes a plurality of user interface controls displayed on the display screen, wherein previously only one of the plurality of apps was displayed on the display screen;
   in response to the detecting:
      identifying a set of one or more user interface controls within the plurality of user interface controls, wherein each of the set of user interface controls has an increased display preference; and
      enlarging, on the display screen, each of the user interface controls included in the identified set of user interface controls, wherein at least one of the plurality of user interface controls that were not identified as having an increased display preference are displayed in a non-enlarged format.

2. The method of claim 1 further comprising:
   prior to the detecting:
      receiving, from a user, an identification of one or more of the user interface controls included in the set of user interface controls corresponding to one or more of the plurality of apps; and
      storing the identification of the one or more user interface controls in a file stored in the memory;
   wherein the identifying includes retrieving the stored identification of the user interface controls that correspond to one of the plurality of apps that are being displayed on the display screen.

3. The method of claim 1 further comprising:
   prior to the detecting:
      receiving, from a user, a plurality of selections of one or more of the user interface controls included in the set of user interface controls corresponding to one or more of the plurality of apps; and
      storing an identification of the selected user interface controls in a file stored in the memory;
   wherein the identifying includes retrieving the stored identification of the user interface controls that correspond to one of the plurality of apps that are being displayed on the display screen.

4. The method of claim 3 further comprising:
   determining the set of user interface controls based on a number of the plurality of selections being compared to a threshold.

5. The method of claim 1 further comprising:
prior to the detecting:
- tracking a movement of a user's eye during a usage of one or more of the plurality of apps, wherein the tracking identifies a focus of the user's eye on an identified one or more user interface controls corresponding to one or more of the plurality of apps; and
- storing the identification of the one or more user interface controls in a file stored in the memory;
wherein the identifying includes retrieving the stored identification of the user interface controls that correspond to one of the plurality of apps that are being displayed on the display screen.

6. The method of claim 1 further comprising:
tracking a movement of a user's eye while the plurality of apps are being displayed on the display screen; and
determining that a focus of the user's eye is directed to a selected one of the plurality of user interface controls, wherein the selected user interface control is included in the set of user interface controls that is enlarged on the display screen.

7. The method of claim 6 further comprising:
detecting that the focus of the user's eye is no longer directed to the selected user interface control; and
removing the selected user interface control from the set of user interface controls so that the selected user interface control is displayed without enlargement.

8. An information handling system comprising:
one or more processors;
a memory coupled to at least one of the processors;
a display screen accessible by at least one of the processors; and
a set of computer program instructions stored in the memory and executed by at least one of the processors in order to perform actions comprising:
detecting that a plurality of apps are being displayed on the display screen, wherein each of the apps includes a plurality of user interface controls displayed on the display screen, wherein previously only one of the plurality of apps was displayed on the display screen;
in response to the detecting:
- identifying a set of one or more user interface controls within the plurality of user interface controls, wherein each of the set of user interface controls has an increased display preference; and
- enlarging, on the display screen, each of the user interface controls included in the identified set of user interface controls, wherein at least one of the plurality of user interface controls that were not identified as having an increased display preference are displayed in a non-enlarged format.

9. The information handling system of claim 8 wherein the actions further comprise:
prior to the detecting:
- receiving, from a user, an identification of one or more of the user interface controls included in the set of user interface controls corresponding to one or more of the plurality of apps; and
- storing the identification of the one or more user interface controls in a file stored in the memory;
wherein the identifying includes retrieving the stored identification of the user interface controls that correspond to one of the plurality of apps that are being displayed on the display screen.

10. The information handling system of claim 8 wherein the actions further comprise:
prior to the detecting:
- receiving, from a user, a plurality of selections of one or more of the user interface controls included in the set of user interface controls corresponding to one or more of the plurality of apps; and
- storing an identification of the selected user interface controls in a file stored in the memory;
wherein the identifying includes retrieving the stored identification of the user interface controls that correspond to one of the plurality of apps that are being displayed on the display screen.

11. The information handling system of claim 10 wherein the actions further comprise:
determining the set of user interface controls based on a number of the plurality of selections being compared to a threshold.

12. The information handling system of claim 8 wherein the actions further comprise:
prior to the detecting:
- tracking a movement of a user's eye during a usage of one or more of the plurality of apps, wherein the tracking identifies a focus of the user's eye on an identified one or more user interface controls corresponding to one or more of the plurality of apps; and
- storing the identification of the one or more user interface controls in a file stored in the memory;
wherein the identifying includes retrieving the stored identification of the user interface controls that correspond to one of the plurality of apps that are being displayed on the display screen.

13. The information handling system of claim 8 wherein the actions further comprise:
Tracking a movement of a user's eye while the plurality of apps are being displayed on the display screen; and
determining that a focus of the user's eye is directed to a selected one of the plurality of user interface controls, wherein the selected user interface control is included in the set of user interface controls that is enlarged on the display screen.

14. The information handling system of claim 13 wherein the actions further comprise:
detecting that the focus of the user's eye is no longer directed to the selected user interface control; and
removing the selected user interface control from the set of user interface controls so that the selected user interface control is displayed without enlargement.

15. A computer program product comprising:
a computer readable storage medium, comprising computer program code that, when executed by an information handling system, executes actions comprising:
detecting that a plurality of apps are being displayed on the display screen, wherein each of the apps includes a plurality of user interface controls displayed on the display screen, wherein previously only one of the plurality of apps was displayed on the display screen;
in response to the detecting:
- identifying a set of one or more user interface controls within the plurality of user interface controls, wherein each of the set of user interface controls has an increased display preference; and
- enlarging, on the display screen, each of the user interface controls included in the identified set of user interface controls, wherein at least one of the plurality of user interface controls that were not identified as having an increased display preference are displayed in a non-enlarged format.

16. The computer program product of claim 15 wherein the actions further comprise:

prior to the detecting:
receiving, from a user, an identification of one or more of the user interface controls included in the set of user interface controls corresponding to one or more of the plurality of apps; and
storing the identification of the one or more user interface controls in a file stored in the memory;
wherein the identifying includes retrieving the stored identification of the user interface controls that correspond to one of the plurality of apps that are being displayed on the display screen.

17. The computer program product of claim 15 wherein the actions further comprise:
prior to the detecting:
receiving, from a user, a plurality of selections of one or more of the user interface controls included in the set of user interface controls corresponding to one or more of the plurality of apps; and
storing an identification of the selected user interface controls in a file stored in the memory;
wherein the identifying includes retrieving the stored identification of the user interface controls that correspond to one of the plurality of apps that are being displayed on the display screen.

18. The computer program product of claim 17 wherein the actions further comprise:
determining the set of user interface controls based on a number of the plurality of selections being compared to a threshold.

19. The computer program product of claim 15 wherein the actions further comprise:
prior to the detecting:
tracking a movement of a user's eye during usage of one or more of the plurality of apps, wherein the tracking identifies a focus of the user's eye on an identified one or more user interface controls corresponding to one or more of the plurality of apps; and
storing the identification of the one or more user interface controls in a file stored in the memory;
wherein the identifying includes retrieving the stored identification of the user interface controls that correspond to one of the plurality of apps that are being displayed on the display screen.

20. The computer program product of claim 15 wherein the actions further comprise:
tracking a movement of a user's eye while the plurality of apps are being displayed on the display screen;
determining that a focus of the user's eye is directed to a selected one of the plurality of user interface controls, wherein the selected user interface control is included in the set of user interface controls that is enlarged on the display screen;
detecting that the focus of the user's eye is no longer directed to the selected user interface control; and
removing the selected user interface control from the set of user interface controls so that the selected user interface control is displayed without enlargement.

* * * * *